United States Patent Office 2,935,497
Patented May 3, 1960

2,935,497
POLYMERIZATION OF OLEFINS

Archibald P. Stuart, Media, Pa., assignor to Sun Oil Company, Philadelphia, Pa., a corporation of New Jersey No Drawing. Application September 6, 1956
Serial No. 608,183

1 Claim. (Cl. 260—93.7)

This invention relates to the polymerization of olefins, and is more particularly directed to a process for the production of solid polymers of alpha-olefins, or solid copolymers of alpha-olefins, by contacting the olefinic material with a specific solid catalyst in the presence of a polymerization activator.

The preparation of solid polymers of olefins by use of a variety of catalysts, or polymerization initiators, has heretofore been described. For example, use of small amounts of oxygen, generally less than about 0.1%, at pressures of above about 1,000 atmospheres has been described as effective for obtaining solid polymers of ethylene. The use of solid catalysts, such as metal oxides, which are effective for preparing solid polymers of ethylene has also been described. In prior processes using solid catalysts, even small quantities of impurities must generally be excluded from the process. These prior processes have not proved entirely satisfactory. Difficulties include, for example, the necessity of using special, expensive catalysts in which the metal of a metal oxide must be converted to and maintained in a specific valence state; the necessity of using high pressure, which requires special and expensive equipment and operation procedures; and the necessity for removing all but trace quantities of impurities from the reactants and polymerization zone components, which requires special and expensive separation and purification procedures.

An object of the process of the invention is to provide a process for the preparation of solid polymers or copolymers of alpha-olefins. Another object is to provide a process for the polymerization of normally gaseous olefins. A specific object of the invention is to provide a process for the preparation of solid polymers of ethylene or propylene at relatively low temperatures and relatively low pressures using an inexpensive, easily prepared solid catalyst and a small quantity of polymerization activator. A further object is to provide a process for the preparation of solid polymers of ethylene or propylene which does not require use of special separation means for preparing the components of the reaction mixture. Other objects and their achievement in accordance with the invention will be apparent hereinafter.

It has now been found that by simultaneously contacting, under polymerizing conditions, an alpha-olefin maintained in a liquid organic reaction medium with a metal sulfide and a polymerization activator, as hereinafter defined, the olefin is rapidly polymerized to solid polymers. For convenience, the following description of the process is largely directed to the polymerization of ethylene and the solid polymers obtained therefrom are designated as "polyethylene."

In accordance with an embodiment of the invention, a petroleum refinery stream consisting principally of ethylene is contacted, at a temperature of 85° C. and atmospheric pressure, with a reaction mixture consisting essentially of isooctane containing suspended particles of molybdenum disulfide and a small, activating quantity of aluminum triethyl. The ethylene is rapidly polymerized to solid polymers which are recoverable from the reaction mixture. The process of the invention thus provides a low temperature, low pressure process for preparing solid polymers of normally gaseous olefins which uses an inexpensive catalyst and in which special purification means for the olefinic feed material are unnecessary.

The process of the invention is directed to the polymerization of alpha-olefins. By "alpha-olefins," as used herein, is meant olefins which have a terminal olefinic linkage, i.e., a terminal carbon atom is attached through an olefinic double bond to the adjacent carbon atom. It is preferred to use normally gaseous olefins in the process. Ethylene, propylene and mixtures of ethylene and propylene are thus preferred feed stocks for the process. Other alpha-olefins such as butene-1, 1,3-butadiene, and the pentenes, hexenes, heptenes, and octenes having a terminal olefinic linkage, and mixtures thereof, can be used with good results. Such olefins, including the preferred normally gaseous olefins, or mixtures thereof, can be from any source such as from the thermal or catalytic cracking of higher boiling hydrocarbons, from the dehydrogenation of paraffins, from the dehydration of alcohol, or the like. Saturated paraffins, such as ethane, propane and butane can be present and act as diluents, and hence special separation means for the removal of saturated hydrocarbons is unnecessary. However, it is preferred to maintain the olefinic content of the feed material above about 70% by weight. Other polymerizable materials such as styrene, vinyl chloride, and the like, can be present to an extent of about 25% by weight, based on the alpha-olefin, and good results obtained. When present, such other polymerizable materials appear to copolymerize with the alpha-olefin to give valuable copolymers.

Metal sulfides which can be employed are those known to be hydrogenation catalysts in processes such as the hydrogenation of unsaturated hydrocarbons, and are the sulfides of the metals of group VIa and group VIII of the periodic table and vanadium sulfide. Sulfides of chromium, molybdenum, tungsten, nickel, and mixtures thereof, and particularly molybdenum disulfide and tungsten disulfide, are the preferred metal sulfides, since excellent results are obtained therewith. The sulfides, per se, can be used, or they can be deposited on a carrier such as alumina, titania, zirconia, bauxite, activated carbon, or the like. The preparation of such catalysts for use in hydrogenation processes is well known.

The presence of a polymerization activator is essential to the process of the invention, since otherwise polymerization to any substantial extent is not observed. Materials which can be used as polymerization activators in the process of the invention are metal alkyls, metal hydrides, metal borohydrides, alkyl metal halides, metal carbides, and alkali or alkaline earth metals in which case such metals may be combined with an alkyl halide. Suitable metal alkyls include alkyl derivatives of aluminum, zinc, beryllium, chromium, magnesium, lithium and lead. Aluminum triethyl, aluminum triisopropyl, aluminum triisobutyl, and the magnesium and zinc analogues thereof give good results in the process and are preferred, but metal alkyls having up to about 12 carbon atoms in the alkyl groups can be used with good results. Alkali metal alkyls such as n-butyllithium, methylsodium, butylsodium, phenylisopropylpotassium, and the like, also illustrate metal alkyls that give good results in the process. Metal hydrides which can be used as polymerization activators include, for example, lithium hydride, lithium aluminum hydride and sodium hydride. Metal borohydrides such as sodium borohydride and potassium borohydride illustrate the borohydrides which can be used. Alkyl metal halides which can be used are Grignard reagents such as methylmagnesium bromide, ethylmagnesium chloride, phenylmagnesium bromide, and the like. Calcium carbide and barium carbide illustrate the metal carbides which give good results in the process. Alkali metals and alkaline earth metals which can be used include, for example, lithium, sodium, potassium, calcium, strontium and barium. When using such metals it is preferred to include an alkyl halide such as ethyl chloride, ethyl bromide, isopropyl chloride, t-butyl bromide, or the like, in the reaction mixture. The presence of a polymerization activator is essential to the process of the invention, as above stated, since otherwise polymerization to any substantial extent is not observed. However, only a small quantity of the activator is necessary, and a molar ratio of activator to sulfide catalyst of from 1:1,000 to 1:1 gives good results, but even higher ratios can be used, say up to about 10:1.

The process of the invention can be operated as slurry type operation or as a continuous process. In slurry operation, particles of the metal sulfide are suspended in an inert, liquid organic reaction medium, and a quantity of a polymerization activator added thereto to form the reaction mixture of process of the invention. If desired, the polymerization activator can be added periodically in relatively small quantities to the reaction mixture. Ethylene in gas phase or dissolved in an inert organic material, which if used is preferably the same as the organic medium, is contacted with the reaction mixture. The temperature of the reaction mixture during the contacting is maintained in the range of from about 20° C. to 260° C., and preferably is within the range of from 80° C. to 190° C. The pressure to employ must be sufficient to maintain liquid phase operation. The pressure can vary from about atmospheric pressure to about 900 p.s.i.g. (pounds per square inch gauge) and good results obtained, but even higher pressure can be used if desired. The rate of addition of ethylene to the reaction medium can be adjusted so that substantially all of the ethylene is converted to solid polymers. If desired, however, ethylene can be introduced at a faster rate and the excess ethylene recovered and recycled to the process.

When performing the process as a continuous operation, the metal sulfide catalyst, in the form of particles, is introduced into a reactor and ethylene dissolved in an inert organic reaction medium, to which is added a small quantity of a polymerization activator, is passed through the reactor in contact with the metal sulfide. In some instances the polymerization activator can be incorporated into the metal sulfide bed, such as where the activator is substantially insoluble in the reaction medium. The temperature and pressure conditions are maintained within the range described for slurry operation. The space rate is advantageously maintained within the range of from 0.1 to 10 volumes of reaction mixture per volume of catalyst per hour (v./v./hr.).

The organic reaction medium to employ must be liquid and substantially inert under the conditions used. Saturated hydrocarbons, including paraffins such as the pentanes, hexanes, octanes, decanes, and mixtures thereof, and cycloparaffins, such as cyclopentane, alkyl substituted cyclopentanes, cyclohexane, alkyl substituted cyclohexanes, decalin, mixtures thereof with each other and with paraffins give good results and are preferred. Aromatic hydrocarbon such as benzene, toluene, xylene, and the like can also be used with good results and inert ethers, such as diethyl-ether, can be used in some instances with good results. The quantity of organic reaction medium to employ can be varied widely and good results obtained. Generally, a quantity sufficient to form a light slurry of the solid catalyst particles is used, which amount is advantageously from about 5 to 1,000 parts or more, based on the weight of the solid catalyst phase, and when continuous operation is used, a quantity sufficient to dissolve from about 1% to 20% by weight of the olefin should be used.

The solid polymer products of the invention may be dissolved, suspended or both dissolved and suspended in the hydrocarbon reaction medium. Recovery of the solid polymers can be performed by any convenient means. Preferably the polymers are separated from the sulfide catalyst, such as by dissolving the polymers at an elevated temperature, in a solvent such as xylene, and cooling to a temperature of from about 10° C. to 25° C. to precipitate dissolved polymers. A washing step can advantageously be employed, and such step can be performed to deactivate the polymerization activator. The solid polymers can then be recovered by filtration and dried or otherwise further treated as desired.

The products of the invention can vary from soft, waxlike polymers having molecular weights of from about 300 to 800 to hard, polymers having molecular weights of up to about 50,000 or more. The products are useful as thin films for wrapping food products and the like, as pipes for transporting fluids, as containers for corrosive fluids, and the like. Such articles can be made by molding, extrusion or other fabrication processes.

The following examples illustrate embodiments of the invention in which "parts" refers to parts by weight:

Molybdenum trisulfide was contacted with hydrogen under reducing conditions so that the trisulfide was substantially converted to the disulfide. 20 parts of the resulting molybdenum disulfide, in particle form, were introduced into a reactor. A 24 volume percent solution of aluminum triisobutyl in isooctane was added, a total of 11.6 parts of triisobutyl aluminum being added. The molar ratio of aluminum triisobutyl to molybdenum disulfide was 1:2. Air was substantially removed from the reactor and about 304 parts of xylene added. With stirring, ethylene was introduced into the reactor to a pressure of 200 p.s.i.g. The reactor was heated to about 110° C. and the pressure adjusted to 400 p.s.i.g. The pressure dropped, indicating polymerization of the ethylene. The temperature was gradually increased to 155° C. and additional ethylene was periodically added to maintain the pressure within the range of from about 400 to 500 p.s.i.g., three additions of ethylene being made over a period of 65 minutes. The reaction was then stopped. About 160 parts of methanol was added, with stirring, to the reaction mixture, which was then filtered. The solid materials were then heated with xylene and subsequently dried in a vacuum oven. There were recovered about 38.5 parts of a high molecular weight, solid polymer product, the product containing a portion of solid material from the catalyst and some xylene which was not removed by the treating operations used.

The above procedure was repeated, using the same quantities of the same materials, except that the temperature of the reaction mixture was maintained within the range of from 110° C. to 115° C. Results substantially equivalent to those above described were obtained, the yield and polymer product being substantially identical therewith.

When other metal sulfide catalysts and/or when other polymerization activators are used, as above described, substantially equivalent results are obtained. However, adjustment of the reaction conditions, within the herein defined limits, is advantageous to obtain optimum results with a given system. Other olefins, as above defined, give similar solid polymer products when used in the process, and good results are obtained therewith.

The invention claimed is:

Process for the preparation of solid polymers which comprises contacting a solution of an olefin selected from the group consisting of ethylene and propylene in an inert hydrocarbon solvent, at a temperature of from about 20° C. to about 260° C., with a catalyst consisting of molybdenum disulfide activated by an aluminum alkyl, and recovering solid polymers from the reaction mixture.

References Cited in the file of this patent

UNITED STATES PATENTS

| | | |
|---|---|---|
| 2,212,155 | Ellis | Aug. 20, 1940 |
| 2,224,071 | Wasserman | Dec. 3, 1940 |

FOREIGN PATENTS

| | | |
|---|---|---|
| 538,762 | Belgium | Dec. 6, 1955 |